June 2, 1964  C. E. KEPLER ETAL  3,135,291
BISTABLE FLUID VALVE
Filed June 14, 1961

INVENTORS
ROBERT E. OLSON
CHARLES EDWARD KEPLER

BY *Teller, McCormick, Paulding & Huber*

ATTORNEYS

United States Patent Office 3,135,291
Patented June 2, 1964

3,135,291
BISTABLE FLUID VALVE
Charles Edward Kepler, East Hartford, and Robert E. Olson, Windsor, Conn., assignors to United Aircraft Corporation, East Hartford, Conn., a corporation of Delaware
Filed June 14, 1961, Ser. No. 117,067
3 Claims. (Cl. 137—608)

This invention relates to means for providing angularly related fluid jets which may be utilized in exercising directional control over the flight of vehicles such as liquid and solid propellant rockets.

It is the general object of the invention to provide a valve and nozzle arrangement which is adapted for the selective emission of first and second fluid jets which are usable for directional control of a vehicle and which are angularly related to render the valve substantially immune to atmospheric pressure change.

The drawing shows two embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Hot gases such as may result from combustion in a solid or liquid propellant rocket can provide substantially greater thrust than cold gases when emitted in jet form. However, such gases are difficult to handle for extended periods of time by mechanical means. A bistable fluid operated valve having no working mechanical parts is particularly well suited to the control of hot gas flow, but it has one serious disadvantage in high altitude and space use. As will be seen, such a valve is sensitive to atmospheric pressure variation and may be rendered inoperative at high pressure ratios encountered at very low atmospheric pressures and in space.

Figure 1:
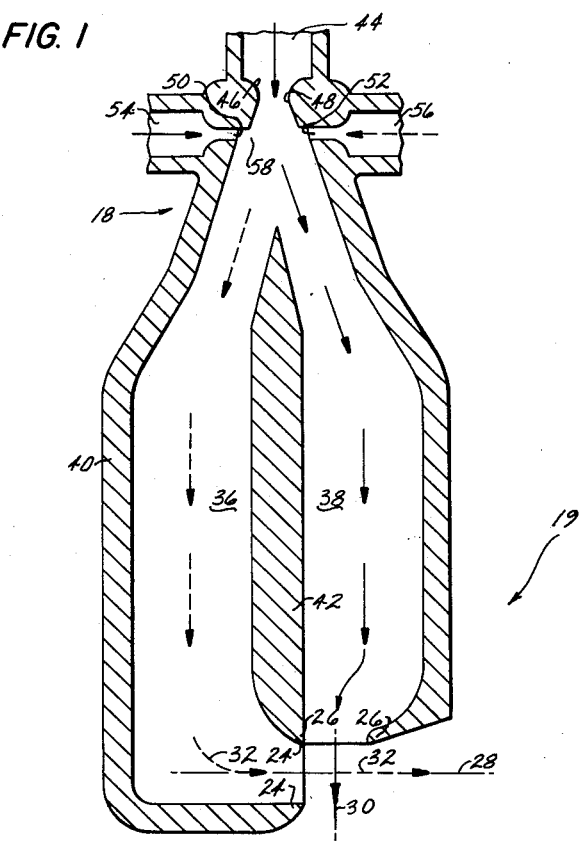
FIG. 1 is a schematic illustration of a valve and nozzle arrangement constituting a presently preferred embodiment of the invention.

Referring now to the drawing, a bistable fluid operated valve is indicated generally at 18 in FIG. 1 and an associated nozzle section is indicated generally at 19. First and second exhaust nozzles are shown respectively at 24 and 26 and said nozzles are adapted to emit first and second fluid jets. The jets may be used to particular advantage for steering or direction controlling purposes of rockets and the like and they will be referred to herein as "steering jets." However, the term "steering jets" is not to be taken as a limitation as to use in the specification or in the claims which follow.

As shown, the nozzles 24 and 26 are arranged with their longitudinal center lines 28 and 30 angularly related so that the steering jet emitted from each nozzle crosses and blocks the mouth of the other nozzle. This arrangement is in accord with the invention and results in immunity of the valve 18 to atmospheric pressure variation and, as will be seen, in substantial improvement in the operating range of the valve. The invention contemplates substantial variation in the angular relation of the nozzle center lines, but the right angular relationship shown is presently preferred.

The valve 18 is or may be of a known type and includes an inlet passageway 44 which communicates with each of a pair of branch passageways 36 and 38 leading to the nozzles 24 and 26. The inlet passageway and the branch passageways are defined within a casing or housing means 40 and a splitter panel 42 extends between and separates said inlet passageways. Hot gases or other fluid may be introduced to the inlet passageway 44 from a suitable high pressure source as, for example, a combustion chamber in a rocket or other vehicle carrying the valve and nozzle section.

Fluid flow at or in excess of sonic velocity is essential to effective operation of a fluid operating means for switching a fluid stream from one to the other of the branch passageways 36 and 38. A converging section 46 in the inlet passageway 44 can serve to accelerate combustion gases or other fluid to sonic velocity and, downstream of the convergent section 46, the inlet passageway is shown to have a gradually diverging section 48. The section 48 can effect further acceleration of combustion gases or other fluid in accordance with known phenomena.

A switching or operating means in the valve 18 for selectively directing fluid flow through the branch passageways 36 and 38 from the inlet passageway 44 includes first and second fluid jets emitted respectively from opposed first and second control nozzles or nozzle sections 50 and 52. The nozzles 50 and 52 are arranged so that switching jets issuing therefrom are substantially transverse with respect to the direction of fluid flow through the inlet passageway 44. As shown, the control nozzles 50 and 52 are formed integrally with the aforesaid casing or housing means 40 and they have associated supply passageways 54 and 56 which are connectible with a suitable high pressure fluid source not shown. Also associated with the supply passageways 54 and 56 but not shown and forming no part of the present invention is a means operable to selectively connect said passageways with the high pressure fluid source to cause the first and second switching jets to issue selectively from their corresponding control nozzles.

The control nozzles 50 and 52 communicate with the inlet fluid passageway 44 at a short outwardly stepped or sharply divergent section 58 of the inlet passageway 44 and the said section serves an important function in the switching of fluid flow from one branch passageway to the other. A localized low pressure region is created in the section 58 adjacent an inactive control nozzle when fluid flow occurs past the nozzle and this region contributes to maintenance of the fluid stream wholly within one of the branch passageways. For example, the second branch passageway 38 is shown as being active in the drawing and substantially all fluid passing through the inlet passageway 44 also passes through said branch passageway at least partially under the influence of a low pressure region adjacent the mouth of the control nozzle 52. Conversely, when inlet passageway fluid passes through the first branch passageway 36, a low pressure region occurs adjacent the mouth of the control nozzle 50 and this region contributes to the maintenance of the fluid stream wholly within the passageway 36.

In the switching operation of the bistable valve 18, continuing switching jets are unnecessary. That is, a switching jet in the form of a pulse issuing from the control nozzle 50 will serve to switch flow from the first branch passageway 36 to the second branch passageway 38 and flow will continue through the said second passageway after termination of the pulse. Conversely, a pulse jet issuing from the control nozzle 52 will switch flow wholly from the branch passageway 38 to the branch passageway 36 and flow will continue through the passageway 36 indefinitely in the absence of a switching jet issuing from the control nozzle 50. Thus, the aforesaid steering jets may be emitted selectively from the aforesaid first and second exhaust nozzles 24 and 26 under the control of switching jets issuing in pulse form selectively from the first and second control nozzles 50 and 52.

The above-described switching operation of the valve 18 is desirably simple and is accomplished wholly in the absence of moving mechanical parts in the valve. Additionally, and as stated, the valve is particularly well suited to the accommodation of hot gases, no high temperature sealing problems, etc., being encountered. However, a significant limitation is encountered in the operation of bistable fluid operated valves of the general type shown. If the ratio of pressures in the branch passageways of such a valve exceeds a maximum allowable limit, the switching jets in the valve are rendered inoperative to switch flow from one branch passageway to the other. The valve loses its bistable characteristics and fluid flow from the valve inlet passageway can be expected to pass indiscriminately and in unregulated proportion through both branch passageways. Obviously, this characteristic of bistable valves of the type shown raises a serious problem in the use of such valves on rocket and like vehicles where extremely low atmospheric pressures are encountered. Pressure levels in the inactive banch passageway of such a valve would ordinarily be expected to vary in keeping with atmospheric pressure and extremely low atmospheric pressures would entail high pressure ratios possibly exceeding the aforesaid maximum limit.

Results and advantages of the above-mentioned arrangement of crossing and blocking steering jets will now be apparent. With the exhaust nozzle and steering jet arrangement described, pressures in the inactive branch passageway and, in consequence, pressure ratios felt in the region of the switching jets are dependent upon the crossing and blocking fluid jet and the valve is thus rendered immune to the effects of atmospheric pressure change. As a result, extremely low atmospheric pressures encountered at high altitude and pressures encountered in space cannot have the detrimental effect of rendering the valve unstable and inoperative for its intended purpose.

Figure 2:
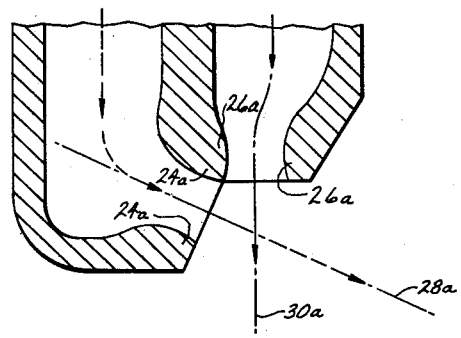
FIG. 2 is a schematic illustration of a nozzle arrangement constituting a second embodiment of the invention.

In FIG. 2 there is shown a nozzle arrangement generally similar to that described but including convergent-divergent nozzles 24$^a$ and 26$^a$, the nozzles 24 and 26 in FIG. 1 being generally convergent. Additionally, it will be observed that center lines 28$^a$ and 30$^a$ of the nozzles 24$^a$ and 26$^a$ are related by an acute angle when viewed toward the mouths of the nozzles. The crossing and blocking action of steering jets issuing from the nozzles 24$^a$ and 26$^a$ is preserved in the FIG. 2 embodiment of the invention with the resulting immunity of an associated fluid operated valve to atmospheric pressure change. Additionally, it is possible to obtain improved thrust efficiency with the convergent-divergent nozzle construction of this embodiment, this being in accord with known exhaust nozzle characteristics.

The invention claimed is:

1. A bistable fluid operated valve and nozzle section usable for directional control of rockets or the like and comprising inlet fluid passageway means, first and second branch fluid passageway means each communicating with said inlet passageway means, first and second opposed control nozzles arranged to selectively emit first and second switching fluid jets to said inlet passageway means, said switching jets serving respectively to direct a fluid stream from said inlet passageway means to said first and second branch passageway means, and adjacent first and second exhaust nozzles communicating respectively with said first and second branch passageway means to selectively emit first and second exhaust jets under the control of said switching jets, said exhaust nozzles being arranged relatively with their longitudinal center lines at least approximately at right angles so that the exhaust jet emitted from each nozzle crosses and blocks the mouth of the other nozzle whereby the operation of said switching jets is rendered immune to atmospheric pressure change.

2. A bistable fluid operated valve and nozzle section usable for directional control of rockets or the like and comprising inlet fluid passageway means, first and second branch fluid passageway means each communicating with said inlet passageway means, first and second opposed control nozzles arranged to selectively emit first and second switching fluid jets to said inlet passageway means, said switching jets serving respectively to direct a fluid stream from said inlet passageway means to said first and second branch passageway means, and adjacent first and second convergent exhaust nozzles communicating respectively with said first and second branch passageway means to selectively emit first and second exhaust jets under the control of said switching jets, said exhaust nozzles being arranged relatively with their longitudinal center lines at least approximately at right angles so that the exhaust jet emitted from each nozzle crosses and blocks the mouth of the other nozzle whereby the operation of said switching jets is rendered immune to atmospheric pressure change.

3. A bistable fluid operated valve and nozzle section usable for directional control of rockets or the like and comprising inlet fluid passageway means, first and second branch fluid passageway means each communicating with said inlet passageway means, first and second opposed control nozzles arranged to selectively emit first and second switching fluid jets to said inlet passageway means, said switching jets serving respectively to direct a fluid stream from said inlet passageway means to said first and second branch passageway means, and adjacent first and second convergent-divergent exhaust nozzles communicating respectively with said first and second branch passageway means to selectively emit first and second exhaust jets under the control of said switching jets, said exhaust nozzles being arranged relatively with their longitudinal center lines at least approximately at right angles so that the exhaust jet emitted from each nozzle crosses and blocks the mouth of the other nozzle whereby the operation of said switching jets is rendered immune to atmospheric pressure change.

References Cited in the file of this patent

UNITED STATES PATENTS

| | | |
|---|---|---|
| 2,726,510 | Goddard | Dec. 13, 1955 |
| 2,943,822 | Hamilton | July 5, 1960 |

FOREIGN PATENTS

| | | |
|---|---|---|
| 795,662 | Great Britain | May 28, 1958 |
| 1,155,534 | France | Dec. 2, 1957 |
| 1,208,542 | France | Sept. 14, 1959 |

OTHER REFERENCES

Bowles et al. (article): "Fluid Computing Elements Open New Doors in Control," Control Engineering Magazine, May 1960, pages 26, 28 and 30.